United States Patent [19]

Schmutz

[11] Patent Number: 5,434,080
[45] Date of Patent: Jul. 18, 1995

[54] COMPOSTING PLANT

[75] Inventor: Urs Schmutz, Ormalingen, Switzerland

[73] Assignee: Frank A.E. Rindelaub, Bole, Switzerland

[21] Appl. No.: 131,899

[22] Filed: Oct. 5, 1993

[30] Foreign Application Priority Data

Oct. 5, 1992 [CH] Switzerland .......... 3106/92

[51] Int. Cl.6 .......... C12M 1/02
[52] U.S. Cl. .......... 435/316; 422/184; 435/819
[58] Field of Search .......... 435/287, 289, 291, 310, 435/312, 313, 315, 316, 818, 819; 422/184; 71/8, 9; 198/502.1, 502.2, 657, 676, 662

[56] References Cited

U.S. PATENT DOCUMENTS

| | | | |
|---|---|---|---|
| 3,357,812 | 12/1967 | Snell | 71/9 |
| 4,138,333 | 2/1979 | Arms et al. | 195/127 |
| 4,433,055 | 2/1984 | Kany | 422/184 |
| 4,552,726 | 11/1985 | Grappelli et al. | 422/184 |
| 4,776,960 | 10/1988 | Cerroni | 210/620 |
| 4,993,943 | 2/1991 | Norris et al. | 432/107 |
| 5,092,453 | 3/1992 | Burke | 198/673 |
| 5,169,782 | 12/1992 | Murphy et al. | 435/312 |
| 5,257,586 | 11/1993 | Davenport | 110/246 |

FOREIGN PATENT DOCUMENTS

| | | | |
|---|---|---|---|
| 0671102 | 2/1966 | Belgium . | |
| 0056202 | 7/1982 | European Pat. Off. | 435/287 |
| 0129520 | 5/1989 | European Pat. Off. . | |
| 0218596 | 11/1989 | European Pat. Off. . | |
| 0113719 | 3/1992 | European Pat. Off. . | |
| 2840084 | 3/1980 | Germany . | |
| 4000510 | 7/1990 | Germany . | |
| 57-191286 | 11/1982 | Japan . | |
| 62-21779 | 1/1987 | Japan . | |
| 63-185369 | 7/1988 | Japan . | |
| 3137082 | 6/1991 | Japan . | |
| 7415727 | 4/1978 | Sweden . | |
| 0565719 | 8/1975 | Switzerland | 71/9 |
| 0633243 | 11/1982 | Switzerland . | |
| 0680134 | 6/1992 | Switzerland . | |
| 2138795 | 10/1984 | United Kingdom . | |
| 2180230 | 3/1987 | United Kingdom | 435/287 |
| 0922089 | 4/1982 | U.S.S.R. . | |
| 1595828 | 9/1990 | U.S.S.R. | 435/313 |
| 1734007 | 5/1992 | U.S.S.R. . | |
| 8601197 | 2/1986 | WIPO . | |

*Primary Examiner*—William H. Beisner
*Attorney, Agent, or Firm*—Limbach & Limbach

[57] ABSTRACT

A fully automatic composting plant in a closed hall closed in by walls and a roof with a plurality of composting lines disposed side by side. Disposed underneath the composting lines are ventilation channels with worm gears which are associated with the lines. Independently driven transport devices, consisting of a fixed discharging worm gear, a fixed charging worm gear above the composting lines, an inclined connecting worm gear and a distributing worm gear moveable above the composting lines, serve to add, transfer and mix the compost material and to carry out the ready-to-use humus. The connecting openings between the ventilation channels and the composting lines consist of elongated slits with cleaning cams gliding therein.

4 Claims, 4 Drawing Sheets

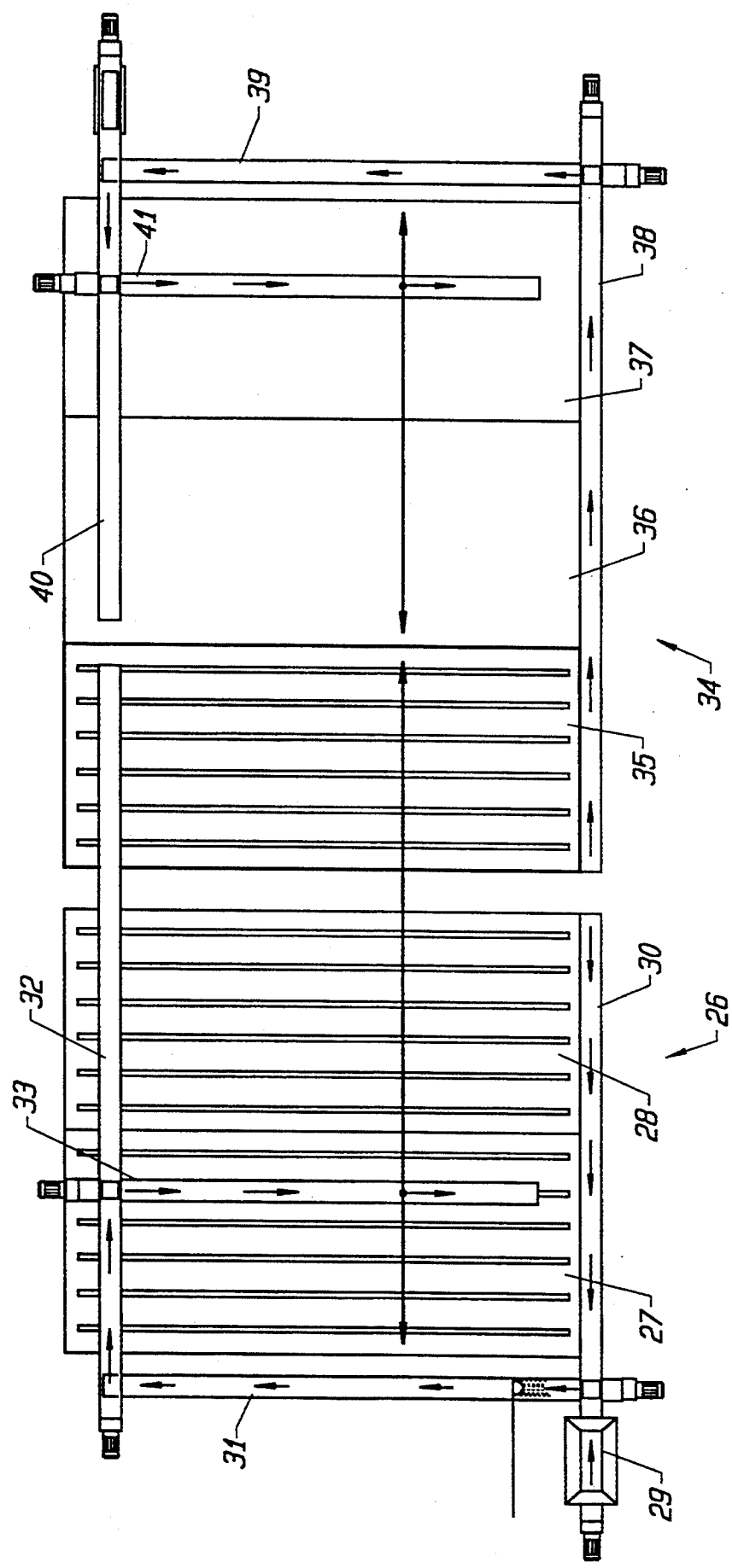

COMPOSTING PLANT

FIELD OF THE INVENTION

The invention relates to a fully automatic composting plant in a closed hall closed in by walls and a roof with several composting lines disposed side by side, ventilation channels disposed thereunder and associated with the lines and means for adding, mixing, turning over, transferring and discharging the raw material to be treated and the compost.

DESCRIPTION OF THE PRIOR ACT

A composting plant of this type is described in Swiss patent No.680 134. As the environmental consciousness of the population increases, there is a growing trend to separate out and compost organic waste products from refuse. This leads to a need for more and, above all, larger composting plants. On the other hand large composting plants are in many cases no longer permitted.

OBJECTS OF THE INVENTION

It is an object of the invention to provide a composting plant which, on the one hand has a capacity to deal with the entire composting requirements of a community or a region and, on the other hand, operates without emissions and without risk to the operating personnel.

BRIEF DESCRIPTION OF THE INVENTION

This object is achieved according to the invention in that the means for adding, mixing, turning over, transferring and discharging the compost material consist of at least one fixed discharging worm gear which extends under the discharging openings of several composting lines, at least one fixed charging worm gear which extends above several composting lines, at least one inclined connecting worm gear and at least one distributing worm gear movable above the composting lines.
The worm gears preferably consist of shaftless spirals which are partially enclosed within a housing.

According to another preferred embodiment the distributing worm gear has discharge openings with a device for their simultaneous opening and closing.

The worm gears preferably consist of two coaxial shaftless spirals lying one inside the other and welded to one another.

BRIEF DESCRIPTION OF THE DRAWINGS

Embodiments of the invention are described hereinbelow with reference to the appended drawings. These show in FIG. 1 a section through a composting plant along a plane that is indicated as A—A in FIG. 2, FIG. 2 a plan view of the same composting plant with the roof removed, FIG. 3 an enlarged cross section through a single composting line, FIG. 4 a cross section through part of a scraper floor, FIG. 5 a longitudinal section through part of a scraper floor.

FIG. 6 the ground plan of an installation with two separate systems or areas and hygienic barriers lying therebetween.

DETAILED DESCRIPTION OF THE INVENTION

A hall composed of longitudinal walls 1, transverse walls 2 and a roof 3 is sealed all round in such a way that escape of air into the environment is substantially only possible through biofilters close to the upper edge of one longitudinal wall provided for this purpose. As an alternative, a biological exhaust air washer in which microorganisms are used to degrade odour-active substances may be installed in place of the biofilter.

Figure 2:
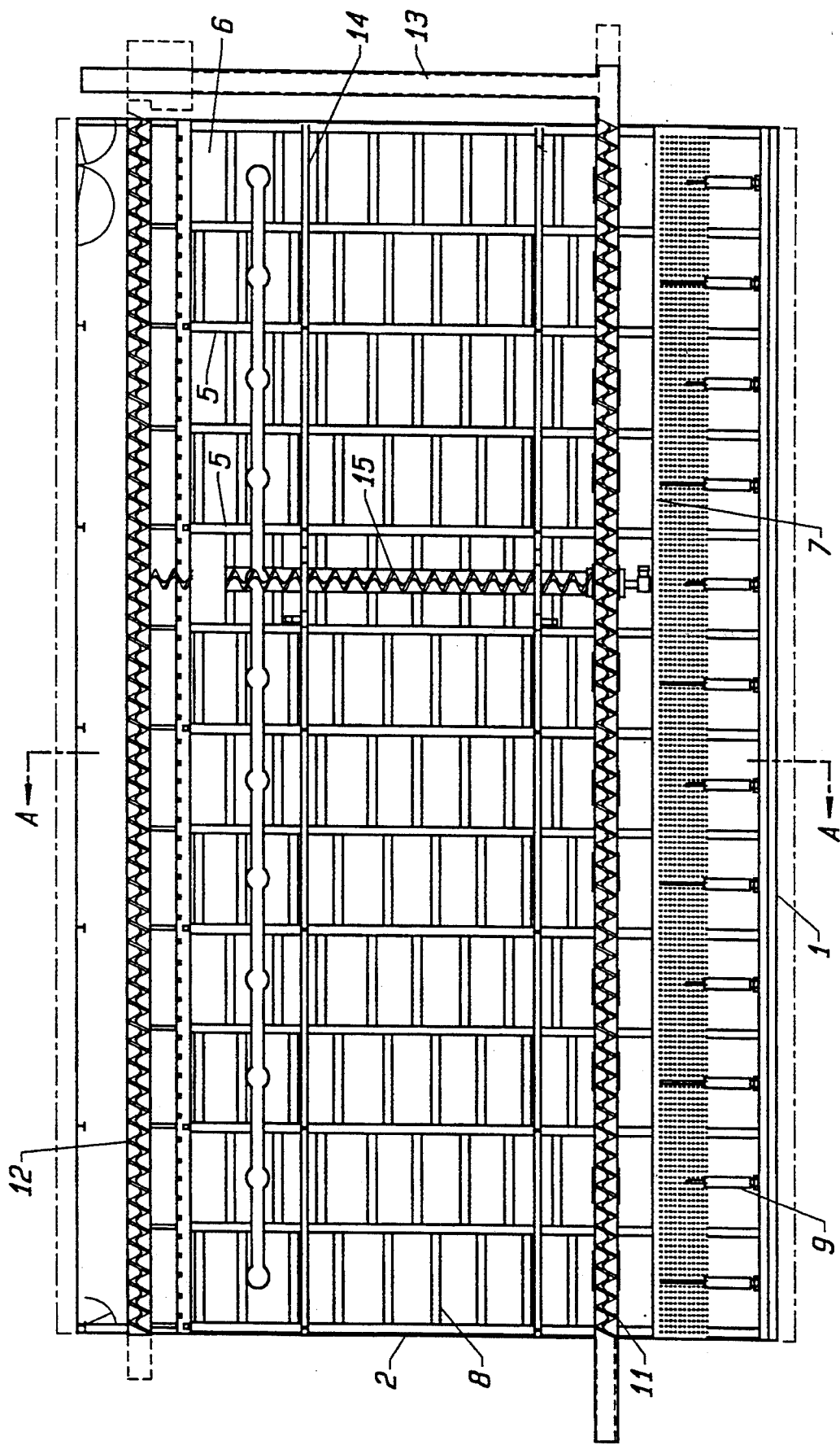

About three quarters of the hall area is taken up by six composting lines or composting chambers 6, disposed next to each other and separated from one another by dividing walls 5, in which the raw material to be treated, sometimes herein referred to as compost material C is located, which may be different in each line. These lines are clearly shown in the plan view of FIG. 2. They are elongated and limited by the dividing walls 5 and by a front limiting wall 7. The lower limit of these lines are so-called scraper floors 8 which are driven by hydraulic cylinders 9. The front limiting wall 7 has discharging openings in their lower regions allocated to the lines.

Conventional, shaftless worm gears provided with housings are provided for transporting the compost material and the ready-to-use compost. The conveyors may be provided with separating pins to break down the compost. A discharging worm gear 11 extends in front of the discharging openings of the composting lines 6 over the entire length of neighbouring lines and may extend on both sides through the transverse walls to the outside.

A fixed charging worm gear 12 extends above the composting lines also over the entire length of the hall and optionally on one or both sides through the transverse walls to the outside. Outside the hall an inclined connecting worm gear 13 is disposed on a side wall and connects the discharging worm gear to the charging worm gear. The connecting worm gear 13 disposed in this embodiment outside the hall may as an alternative also be arranged inside the hall, which is particularly advantageous if the horizontal worm gears are of open construction. Herein the term open construction stands for a construction which may be covered, but which in contradistinction to tubular worm gear, has an air space above the worm gear, the cross section of which is of the same order of size as the worm gear. This has the advantage over the closed conveyor in that it does not become blocked and is also able to convey coarser material. It also achieves better mixing of the material per se and with liquids. The prerequisite for the use of an open worm gear is an inclination of not more than about 30° to the horizontal.

Horizontal runway rails 14 are disposed over the composting lines 6. Disposed on these runway rails 14 of the composting lines is a distributing worm gear 15 which can be moved over all composting lines 6, by means of a travelling gear 16. The housing of the worm gear 15 has six discharge shafts 17 on its underside which are disposed above the chambers at approximately even distances.

The discharge shafts are provided with closure flaps and a device for their simultaneous opening and closing. The opening of the flaps depends on the amount of material located in the distributing worm gear, i.e. at the moment at which the conveyed compost material reaches the end of the distributing worm gear. After a brief period sufficient for emptying, the flaps are automatically closed again. This ensures a substantially more even distribution of material than with constantly open discharge shafts.

The drive of the distributing worm gear is disposed in such a way that it can assume several fixed positions per line. This ensures substantially even distribution of the material added also at right angles to the composting lines. As an alternative it is also possible, instead of the several fixed positions, for the distributing worm gear 15 to be driven backwards and forwards over the composting line continuously or stepwise during discharge. This achieves more even distribution of the compost material across the composting line. To receive the compost material from the charging worm gear 12, the distributing worm gear 15 is in this case provided with two auxiliary worm gears which are disposed under the charging worm gear 12 and extend in a T-shape to the distributing worm gear 15. These work in opposite directions and convey the compost material from the opened discharge port of the charging worm gear 12 to the distributing worm gear 15 when this is driven sideways.

Although the construction and operation of the worm gear results in a very good distribution and mixing of the material being heated, due to changes in its consistency during the composting procedure, it is advantageous to control the amount of material coming from the lines by volumetric measuring means. This may for example be achieved by way of holding periods in the stroke of the cylinder 9. These holding periods are controlled by a program and by measurement of the volume of material in a worm gear preferably in the connecting worm gear 13. The parameter measured may be for example given by a floating flap above the flowing material whose movement is detected electrically and converted into a control signal.

Figure 3:
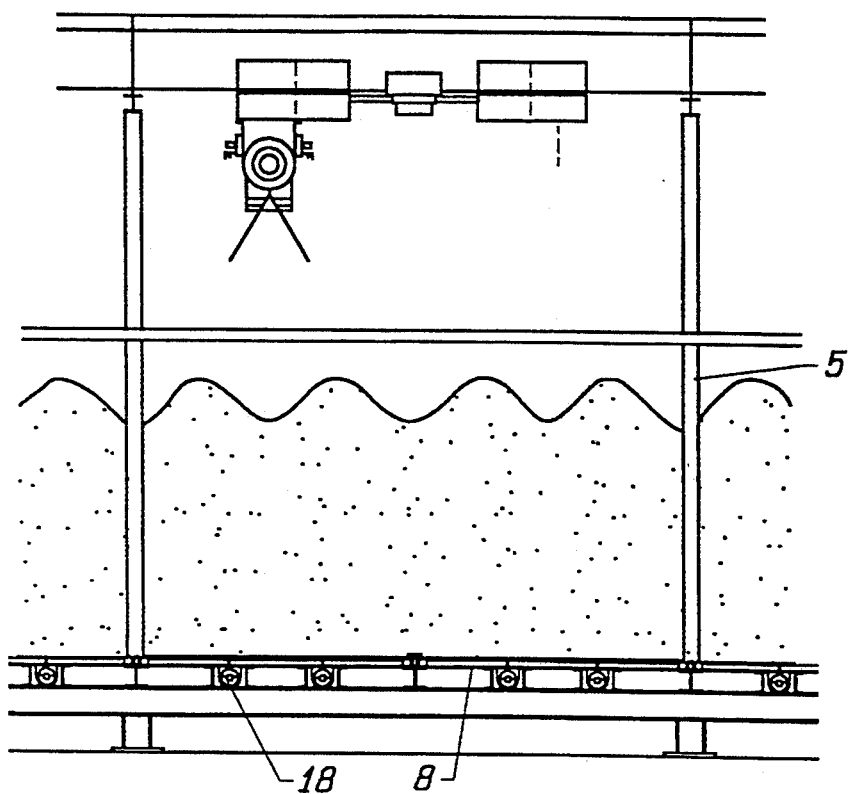
Figure 4:
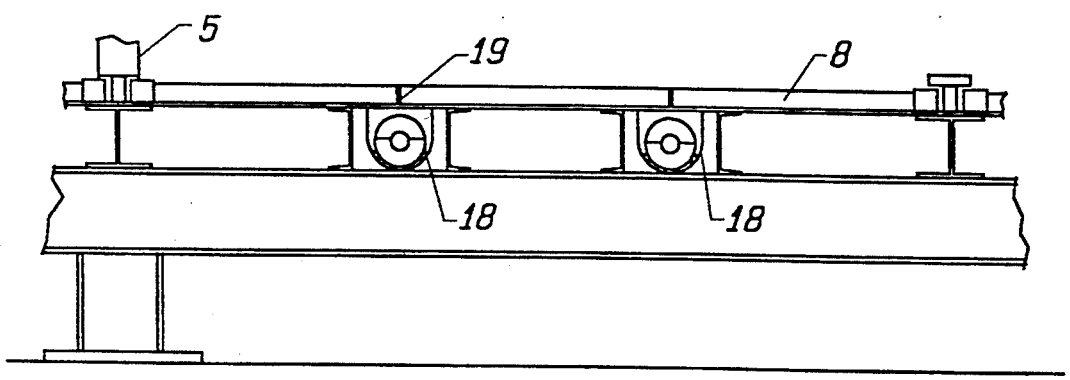
Figure 5:
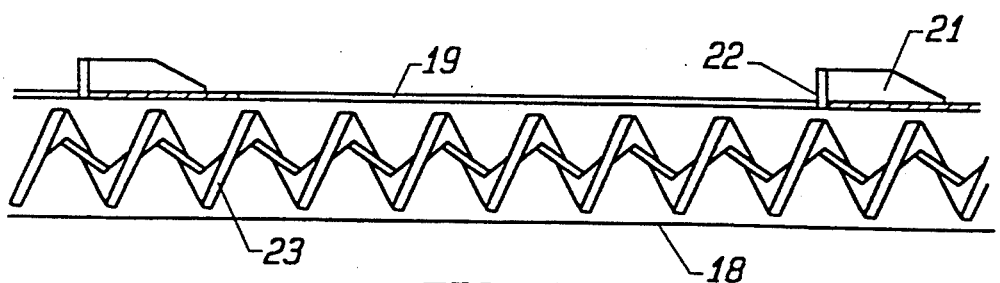

Located below the scraper floor is the ventilation device shown in more detail in FIGS. 3–5, by means of which air is conducted into the compost material on the composting lines. Under each line are four channels 18 having a substantially U-shaped cross-section, which extend over the entire length of the line. Above the channels are slits 19 in the floors. The air reaches the compost material via the channels and the slits.

To prevent the slits 19 becoming blocked by compost material, cams 22 are associated with the slides 21 of the scraper floor which slide in the slits and move backwards and forwards with the movement of the slides. Worm gears 23 disposed in the channels run permanently, but relatively slowly, and convey compost material falling into the channels to the discharging worm gear 11. This prevents blocking of the channels 18.

A simpler solution is also possible, as an alternative to the ventilation channels provided with moving cams and worm gears, in which air ventilation pipes covered upwards with split ballast and strong nonwoven fabric are disposed in the ventilation channels.

Ventilation of the composting lines is advantageously carried out according to the Rotte filter process. In this process, the ventilations of two or several composting lines are combined in series so that the air is withdrawn through one or a part of the composting lines and this air is conducted to one or several other ones. The direction of air flow is changed from time to time.

For this purpose, pumps and valves are provided in the connecting piping between the ventilation channels of the individual composting lines. The valves and the pump and controlled by a central computer.

A measuring sensor on the wall of the hall allocated to each line records parameters important for the composting process, such as temperature, humidity, etc. It may be advantageous also to measure these parameters at other points, above all also, for example, in the compost material itself or in the exhaust air.

An operating room 24 is disposed along the outer side of the longitudinal wall on the side of the composting lines which extends over the entire length of the hall and accommodates the hydraulic drives 9 of the scraper floors.

In operation, the plant is filled with compostable waste material as compost C at a suitable point of the worm gears effecting the transport of the material. If the compost material reaches, for example, the discharge 11, it conveys the compost material to the connecting worm gear 13 from which it is supplied to the charging worm gear 12. It thus reaches, in turn, the distributing worm gear 15 which is first driven into the correct position to fill a selected composting line. In the situation shown in FIG. 2 the distributing worm gear 15 is located over the fourth line.

Figure 1:
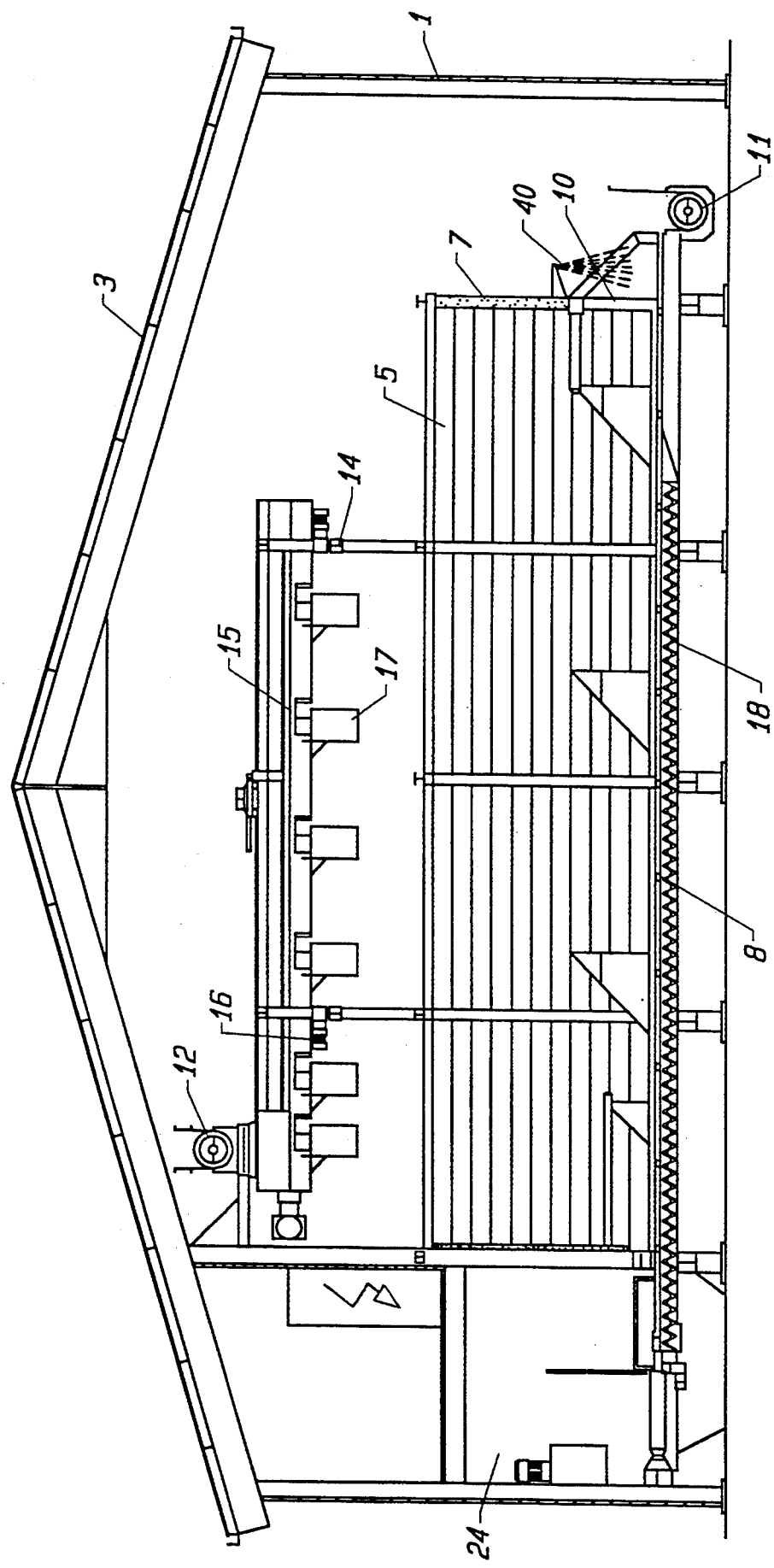

The raw compost material is converted into compost in the closed chamber. For this purpose the temperature and humidity are optionally adjusted to the optimum conditions. It has been found advantageous for purposes of moisture control to use a device 40 (FIG. 1) add water to the compost material at the lower end of the connecting worm gear 13 and to measure the humidity at the upper end. The amount of water added is controlled according to the humidity measured.

The percolating water collected under the composting lines may conveniently be used for moistening the compost material. In this way no waste water, which should be carefully cleaned, is produced.

Any heating or cooling plants and watering devices installed for this purpose may be of conventional design and will therefore not be described in detail herein.

To turn over or mix the compost material or to discharge the ready-to-use compost the lowest layer of material stored in a chamber is in each case pushed to the discharge opening 10 of the chamber by means of the scraper floor installation and passes therethrough into the discharging worm gear 11. The compost material passes therethrough and through the worm gears associated therewith either into the same chamber or into another chamber for mixing purposes.

It is also possible to keep several discharging openings open simultaneously so that compost material reaches the discharge worm gear from various composting lines and is conveyed upwards therefrom. The compost material is already well mixed during the conveying process due to the relatively long conveying distance. It is thus entirely possible to mix extremely wet fermenting sludge from one composting line with sawdust from a different composting line by means of simultaneous discharge and to transport this into a third composting line.

In order to recover the ready-to-use compost, the discharge worm gear 11 is caused to run in the opposite direction so that the compost material conveyed therethrough reaches a storage site or a transport vehicle.

Instead of the moveable distributing worm gear 15 it is also possible to secure one or several worm gears 15 firmly above the composting lines.

The composting plant may also be disposed in round silos or containers which are closed all around.

The ground plan shown in FIG. 6 of an installation with two separate systems or areas shows the general arrangement thereof. A first area 26 has two adjacent composting lines 27,28 and serves to compost contaminated composting material which is fed into the system via the charging shaft 29. Adding, mixing, turning over and transferring the compost material is effected as already described by means of the discharge worm gear 30, connecting worm gear 31, charging worm gear 32 and distributing worm gear 33.

The second area 34 has three adjacent lines 35,36,37 and serves for the further processing of the compost material that has been rendered hygienic. The line 35 closest to the first area 26 exclusively serves to receive the material that has been rendered hygienic and to pass this to the following lines. For this purpose, the charging worm gear 32 of the first area extends above this line 35 and the distributing worm gear 33 can also be driven to this line 35. Conversely, no compost material can pass back to area 26 from area 34.

The area 34 for the compost material that has been rendered hygienic similarly has a discharge worm gear 38, a connecting worm gear 39, a charging worm gear 40 and a distributing worm gear 41.

It is also appropriate to provide equipment for regulating the temperature, humidity, etc., which will not be described in detail herein, in the area 34 for the compost material that has been rendered hygienic. An important aspect is that, in contradistinction to the first area 26, the area 34 is not moistened with percolating water, but with clean water.

I claim:
1. A composting plant, comprising:
   (a) a plurality of composting lines disposed in side by side relationship, the composting lines having a corresponding plurality of discharge openings;
   (b) ventilation channels arranged beneath the composting lines;
   (c) means for adding, mixing, turning over, and discharging compost material and for transferring compost material between any of the composting lines and any other of the composting lines, said means comprising:
      (i) at least one fixed discharging worm gear extending underneath the discharge openings of the composting lines;
      (ii) at least one inclined connecting worm gear, the inclined connecting worm gear positioned to receive compost material from the discharging worm gear;
      (iii) at least one fixed charging worm gear extending above the composting lines and positioned to receive compost material from the inclined connecting worm gear; and
      (iv) at least one distributing worm gear moveable above the composting lines and positioned to receive compost material from the fixed charging worm gear.
2. A composting plant according to claim 1 wherein: the apparatus further comprises
   a second plurality of composting lines separate from the plurality of composting lines and having a plurality of corresponding second discharge openings;
   means associated with the second composting lines for adding, mixing, turning over, and discharging compost material and for transferring compost material between any of the second plurality of composting lines and any other of the second plurality of composting lines, said means comprising:
      (i) at least one second fixed discharging worm gear extending underneath the second discharge openings of the second composting lines;
      (ii) at least one second inclined connecting worm gear, the second inclined connecting worm gear positioned to receive compost material from the second discharging worm gear;
      (iii) at least one second fixed charging worm gear extending above the second composting lines and positioned to receive compost material from the second inclined connecting worm gear; and
      (iv) at least one second distributing worm gear moveable above the second composting lines and positioned to receive compost material from the second fixed charging worm gear; and
   the charging worm gear of the plurality of composting lines extends over at least one of the second plurality of composting lines.
3. A composting plant according to claim 1, further comprising a device for adding water to the compost material at a lower end of the connecting worm gear.
4. A composting plant according to claim 1, wherein the distributing worm gear has a plurality of spaced discharge openings along its length and a plurality of corresponding closure flaps, each flap moveable between a closed position in which the flap covers its corresponding opening and an open position in which the flap at least partially exposes the opening for release of compost material therethrough, and wherein the plant further comprises a device for effecting the simultaneous opening and closing of the flaps.

* * * * *